United States Patent [19]

Lewin

[11] Patent Number: 4,645,090

[45] Date of Patent: Feb. 24, 1987

[54] BAKING UTENSILS

[76] Inventor: David Lewin, 24 Fulton Street, Industria West, Transvaal, South Africa

[21] Appl. No.: 779,219

[22] Filed: Sep. 23, 1985

[30] Foreign Application Priority Data

Sep. 28, 1984 [ZA] South Africa .................... 84/7659
Dec. 21, 1984 [ZA] South Africa .................... 84/9994

[51] Int. Cl.⁴ .......................................... B65D 21/02
[52] U.S. Cl. ................................ 220/23.4; 220/23.2
[58] Field of Search ............... 220/23.2, 23.4, 80.6 T, 220/80.6 D; 99/426, 430, 432, 447

[56] References Cited

U.S. PATENT DOCUMENTS 2,738,897 3/1956 Russell et al. .
3,406,860 10/1968 Kaufman et al. .
3,572,537 3/1971 Boltzer ............................... 220/23.4
3,593,702 7/1971 Zigomalalas ........................ 220/455
4,395,015 7/1983 Reardon .

FOREIGN PATENT DOCUMENTS 1159021 7/1969 United Kingdom .
2075824 5/1981 United Kingdom .

Primary Examiner—George T. Hall
Attorney, Agent, or Firm—Ladas & Parry

[57] ABSTRACT

A baking utensil which is designed for use in commercial baking operations has a rigid frame for supporting baking pans. The pans themselves have non-stick baking surfaces and are attached to the frame in a manner which permit ready detachment and replacement. Typically, the pans' baking surfaces are coated with PTFE (polytetrafluororethylene).

10 Claims, 6 Drawing Figures

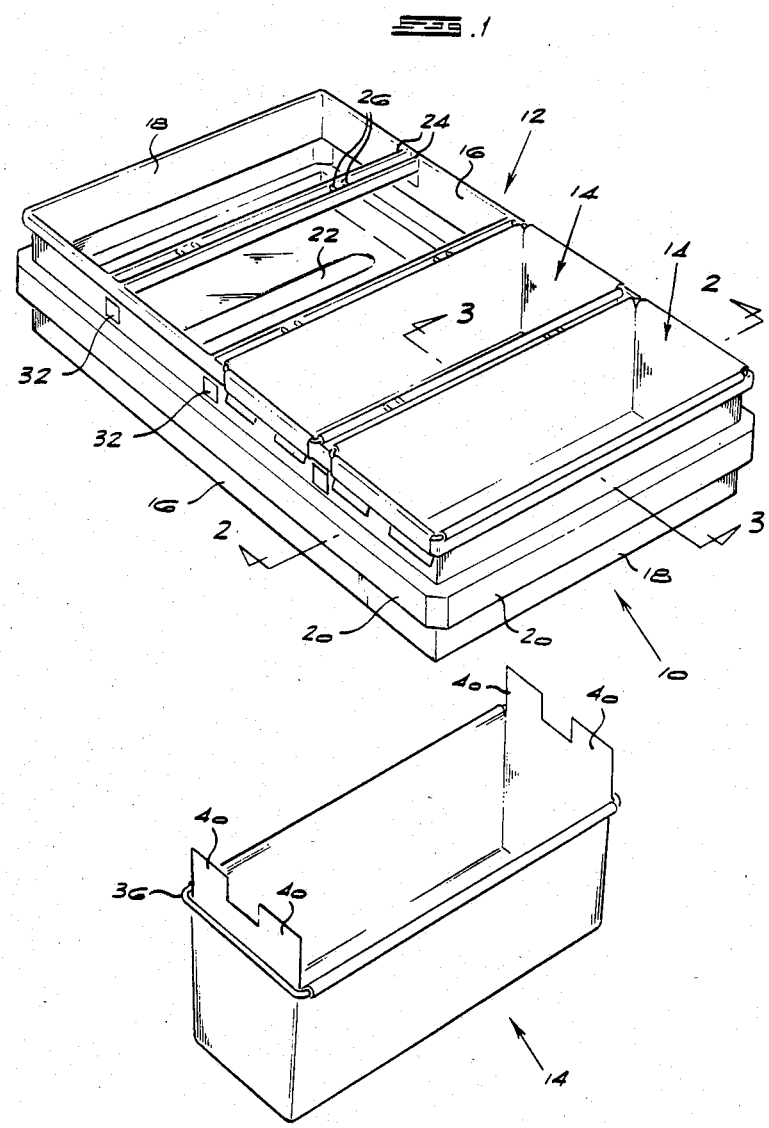

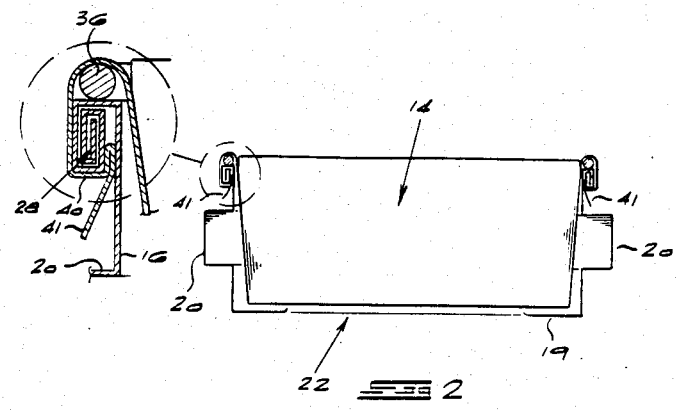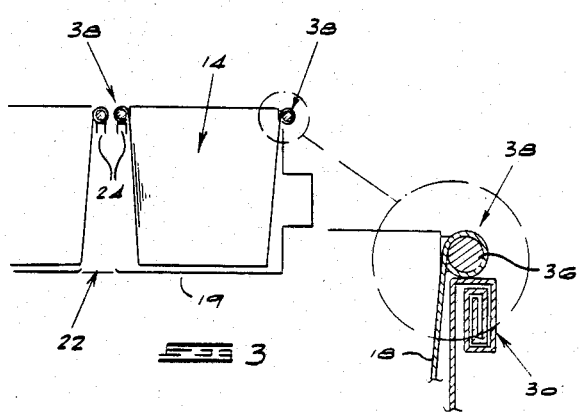

BAKING UTENSILS

BACKGROUND TO THE INVENTION

This invention relates to baking utensils.

The invention relates primarily to baking utensils which are used on a commercial scale in the food preparation industry where baking pans are used over and over again in automatic or semi-automatic production cycles. For example bread is baked in commercial bakeries in pans which are re-usable. Typically, a pan will be used 5 to 10 times per day or perhaps even more. The re-usable baking pans are conventionally formed of steel and have to be sprayed between each baking operation with release agents such as vegetable oils, oil emulsions or the like which enable the baked bread to be separated from the pan.

The repetitive application of such release agents is not only costly but increases hygiene problems. With time, the use of oil-type release agents leads to a build-up of polymerised oil and carbon deposits on the baking surfaces. Besides creating hygiene problems, there is a drop in thermal efficiency because of the build-ups which take place, leading to increased heat requirements and longer baking times.

One solution to the use of release agents in the form of oils has been glazing of the baking pan surfaces with suitable silicone glazes. A small amount of oil is still, however, required. In addition, because of the limited life of the available glazes, recoating is essential from time to time. Organisations which offer a reglazing service will generally be situated away from the majority of bakeries in small towns and so forth, and the pans therefore have to be taken off line for considerable periods of time, at considerable cost.

Baking pans are, in addition, subject to considerable corrosion and wear and tear in use. The pans are usually moved automatically through the baking cycle on conveyor systems which make use of conveyor chains to engage the undersides of the pans. Eventually, the chains score the undersides of the pans and render them unserviceable. Also, the pans are subjected to rough handling in use and this leads eventually to unserviceability as a result of denting and distortion.

Denting and distortion of pans leads inevitably to jamming of the pans on the production line. One possible solution to the problem of pan wear and corrosion is to increase the metal thickness in the pans. This is, however, counter-productive, because thicker pans require greater heating and hence more power, and cause wear and tear to the baking plant.

Conventionally, four or five pans will be held together permanently in a single unit in side-by-side relationship by a strap or frame. Such arrangements are described in U.S. Pat. No. 3,520,438 (Ahrens et al); U.K. patent application No. 2 075 824 A (Ecko Products) and U.S. Pat. No. 3,463,344 (Temple). This means that if a single pan should become unserviceable, whether as a result of build-up or damage, the whole unit has to be taken off line. While treatment is possible to refurbish a pan suffering from undesirable build-up, typically after 1000 or more baking operations, the facilities where this can be done are not always close to hand. The pan units may therefore have to be sent away for long periods for treatment and this leads to production inefficiency. In the worst case, when a single pan has to be scrapped, the whole unit is scrapped. This is obviously very wasteful, since the straps or frames which hold the pans together will usually be somewhat more robust than the pans themselves and would be capable of many more uses were it not for the deficiencies of the pans. Of course, sound pans are also scrapped.

Clearly, the conventional systems are not satisfactory, and it is an object of the invention to provide an alternative system of baking utensils at least some embodiments of the invention being effective at least to reduce the problems outlined above.

SUMMARY OF THE INVENTION

For use in commercial baking operations, the invention provides a baking utensil which includes a rigid frame and at least one baking receptacle which can be attached to, and supported by, the frame in a readily detachable manner, the baking receptacle having baking surfaces which are non-stick in nature, or which are capable of cyclical treatment with release agents.

The baking receptacle may be a baking pan which preferably has its baking surfaces coated with PTFE (polytetrafluoroethylene) so as to be non-stick in nature. Preferably, the pan is deep drawn from sheet material but may also be folded from sheet material.

In one version of the invention, the baking receptacle is in the form of a hollow truncated rectangular pyramid having side walls, an open mouth and a base wall, and includes a circumscribing reinforcing wire extending about the open mouth in engagement at least with the free edges of at least some of the side walls. Preferably, the free edges of the two opposite side walls of the receptacle are rolled about the wire to form a bead, the free edges of the remaining two side walls of the receptacle having projecting tabs foldable about the wire and capable of being tucked beneath beads formed along corresponding edges of the frame to secure the receptacle to the frame with portions of the tabs then projecting freely and being capable of being pulled free of the frame beads to release the receptacle from the frame.

The invention also extends to baking receptacles, either in the form of baking pans themselves or inserts for existing baking pans.

BRIEF DESCRIPTION OF THE DRAWINGS

FIG. 1 shows a partially exploded perspective view of a baking utensil according to the invention;

FIG. 2 shows a section at the line 2—2 in FIG. 1; and

FIG. 3 shows a section at the line 3—3 in FIG. 1.

DESCRIPTION OF AN EMBODIMENT

Referring to the Figures, a baking utensil 10 according to the invention includes a strap or frame 12 and four baking pans 14, two of which are shown in position in engagement with the frame and another of which is shown exploded away from the frame. The fourth pan is not seen in FIG. 1.

The frame 12 has side walls 16, end walls 18, a bottom 19 and an open top. A rectangular section rib 20 protrudes from the walls 16 and 18 and extends right about the frame to provide a bumper. The bumper protects the frame and its pans from damage as a result of impacts with other similar utensils on a conveyor or with other fixed structure. The frame is formed of relatively robust abrasion-resistant stainless steel which makes it resistant to corrosive attack. The steel of the frame is chemically blackened which enhances its heat absorption properties.

The base of the frame is formed with spaced, transversely extending slots 22 the edges of which are inwardly curved as seen in FIGS. 2 and 3 to inhibit snagging on a conveyor chain. The slots are provided to permit efficient heat circulation within the frame during a baking operation.

Struts 24 span in pairs across the frame between the side walls 16, with short spacers 26 serving to space the struts in each pair a short distance apart from one another and maintain the rigidity of the frame. The steel sheet used to form the frame is rolled to form reinforcing beads 28,30 at the upper edges of the walls 16, 18, as shown in FIGS. 2 and 3. Small vents 32 are formed in the walls 16 just below the struts 24.

Before engagement with the frame, a baking pan 14 has the form seen in FIG. 1, with the generally conventional shape of a truncated pyramid. In this case, the pan 14 is deep drawn from sheet material, but it is equally possible for the pan to the folded from sheet material. Typically, the thickness of the sheet material used in the formation of the pan 14 will be about 0,4 mm but where the pan is deep drawn it may be necessary to use thicker sheet material.

The sheet material used for the formation of the pan 14 is coil coated steel sheet and is available from Custom Coil Coaters Limited of the U.K. During the coil coating process, the sheet steel substrate has applied to one surface thereof a coating of a non-stick material, in this case PTFE (polytetrafluoroethylene) or TEFLON (Trade Mark). The surface to which the coating is applied is the inner surface in the Figure.

The pan has a circumscribing wire 36 which extends about its open mouth.

Along the long sides of the pan at the open mouth, the sheet material of the pan is rolled over the wire 36 to form a bead 38 in firm engagement with the wire, which then serves to reinforce the long sides of the pan.

Along the short sides of the pan at the open mouth, the sheet material provides two short tabs 40 which project over the wire as shown in FIG. 1.

The circumscribing wire 36 is dimensioned for the pan to sit snugly in the frame 12 with the wire supported all around by the edges of the walls 16 and 18 and a strut 24 in the case of the outer pans 14 and by the edges of the walls 16 and two struts 24 in the case of the inner pans 14. When the pan has been located in this way, the tabs 40 are bent over the wire 36 along the short sides, and are then tucked beneath the beads 28 at the upper edges of the wall 16, as shown in FIG. 3. A suitable levering tool can be used for this tucking operation. No great effort is required in view of the thinness of the sheet material of the tabs.

When tucked in this way, an end portion 41 of each tab projects freely beneath the bead 28. The pan is securely attached to the frame. As shown in FIGS. 2 and 3, the bottom of the pan is spaced from the bottom 19 of the frame, so permitting free flow of heat beneath and around the pan during baking operations.

In use, the pans 14A to 14D are charged with dough or other mixture in the normal way and the baking utensil 10 is carried by a chain conveyor through the normal prover and tunnel oven. Note that with the non-stick surface provided by the PTFE coating, there is no requirement for the application sheet material which is initially thicker otherwise. This in turn reduces overall costs and increases hygiene. At the end of the baking cycle, the baked loaf can be removed from each pan with little difficulty.

If a pan should become unserviceable for any reason, that pan can be removed from the frame 10 independently of other, sound pans, and replaced with a new pan. This is achieved merely by applying a suitable gripping tool, such as pliers, to the projecting end portions 41 of the tabs 40 and pulling the tabs free of the bead 28, so releasing the pan from the frame. Once detached from the frame, the defective pan is discarded and replaced in the manner described previously with a new pan of the same kind.

When compared with conventional baking utensils, the present invention provides a number of important advantages. A first advantage is the fact that defective pans can be replaced independently of sound pans and of the frame itself. Thus the inventor has recognised that there is no need to try and match the durability of the pan with that of the frame, with the result that the robust frame can be used in many thousands of baking cycles without being limited by the lifespan of the pans. When a pan is no longer serviceable, the same frame is furnished with a new pan. This alone represents a radical departure from the conventional systems.

Since the pans are replaceable at will, there is no need to take a whole utensil off line for refurbishing treatment of an unserviceable pan. Thus, remote bakeries need only carry a stock of new pans for replacement by unskilled labour whenever necessary. The pans themselves are light and easily stacked in bulk for transportation.

With the PTFE-coated pans, there is no need for the application of an oil or oil-based release agent and hence no need to counter the undesirable effects of oil polymerisation and carbon build-up. The absence of oil also means that the baking premises can be kept cleaner and more hygienic and that no down-time is suffered if the conventional automatic oil applicators should fail.

Because the pans are designed to be readily disposable and hence are of thin gauge material, they exhibit excellent thermal efficiency and their use can lower the overall power requirements of a bakery and the baking times required. Note that it may be required by statute that a baked loaf of bread carry the name of the baker. With the present invention using light gauge sheet material for the pans, suitable embossing can easily be impressed into the sheet material, as can fancy designs if required. The embossed information or design can be readily changed merely by replacing the existing pans with new ones carrying new embossing and without the necessity of discarding the whole frame as well.

Note that the description given above is of a preferred version of the invention only. The invention also contemplates a baking receptacle of pan shape but which is intended to serve as a replaceable insert or liner for existing pans in a conventional baking utensil. The insert would have means enabling it to be mated with the existing pan and hence attached to the frame and would have non-stick PTFE-coated surfaces as in the case of the pan described above.

Inserts according to the invention may, for instance, have embossing applied thereto which is complemental to identical embossing on the existing pan itself. When pressed into the pan, the embossing on the insert mates with the embossing on the pan, so holding the insert in the pan and attaching it to the frame.

As in the case of the pans described previously, inserts according to the invention may be deep drawn or folded from coil-coated steel sheet material.

The pans and inserts described above have their backing surfaces coated with PTFE so as to be non-stick in nature. In a less preferred, but still viable alternative version of the invention, the pans or inserts are formed from thin gauge metal, such as stainless steel, which has no non-stick coating. In this case, the pans or inserts will require cyclical treatment with suitable release agents, such as oil, before each baking operation. The advantages of ready replaceability of the pans or inserts is maintained, and it is anticipated that this will still lead to substantial savings in the industry, since there will be no need to refurbish pans or inserts which are no longer serviceable because of excessive carbon or polymerisation build-up.

I claim:

1. A baking utensil for use in commercial baking operations, the utensil comprising a rigid frame which is in the form of a rectangular, open-topped box having a perforated bottom wall and side walls which extend transversely from the bottom wall to their upper edges which define the open top of the box, the side walls of the frame carrying projecting bumpers which extend around the frame, and at least one baking pan which is also in the form of an open-topped box having a bottom wall and side walls and which can be secured to, and supported by, the upper edges of the side walls of the frame with the bottom wall and side walls of the pan protected by the frame, the bottom wall and side walls of the pan being of steel sheet material which is no more than 0.4 mm in thickness, the internal baking surfaces of the bottom wall and side walls of the pan being non-stick in nature.

2. The baking utensil of claim 1 in which the baking receptacle has its baking surfaces coated with PTFE (polytetrafluoroethylene) so as to be non-stick in nature.

3. The baking utensil of claim 1 in which the baking pan is formed from coil-coated steel sheet material.

4. The baking utensil of claim 1 in which the baking pan is formed by a deep drawing operation.

5. The baking utensil of claim 1 in which the baking pan is folded from the steel sheet material.

6. The baking utensil of claim 1, in which the bottom wall of the frame is perforated by virtue of the provision of transversely extending slots.

7. The baking utensil of claim 1, in which the upper edges of the side walls of the frame are rolled to form beads.

8. A baking utensil according to claim 1, in which the pan is in the form of a hollow, truncated rectangular pyramid and includes a circumscribing reinforcing wire extending about the open top of the pan with the upper edges of two opposite side walls of the pan being rolled about the wire to form a bead, the upper edges of the remaining two side walls of the pan having projecting tabs which are foldable about the wire and which are capable of being tucked beneath beads formed along corresponding edges of the frame to secure the pan to the frame with portions of the tabs then projecting freely and being capable of being pulled free of the frame to release the pan from the frame.

9. A baking utensil for use in commercial baking operations, the utensil comprising a rigid frame and at least one baking pan which can be attached to and supported by the frame in a readily detachable manner, the baking pan having internal baking surfaces which are non-stick in nature, and wherein the baking pan is in the form of a hollow, truncated rectangular pyramid having side walls, an open top and a base wall with a circumscribing wire extending about the open top, the upper edges of two opposite side walls of the pan being rolled about the wire to form a bead, the upper edges of the two remaining side walls of the pan having projecting tabs which are foldable about the wire and which are capable of being tucked beneath beads formed along corresponding edges of the frame to secure the pan to the frame with portions of the tabs then projecting freely and being capable of being pulled free of the frame to release the pan from the frame.

10. A baking pan for use in commercial baking operations, the baking pan being formed of steel sheet material having a thickness of not more than 0.4 mm and having the shape of a hollow, truncated rectangular pyramid having side walls, an open top and a bottom wall, the internal baking surfaces of the pan being non-stick in nature or being capable of cyclical treatment with release agents, the pan including a circumscribing reinforcing wire extending about the open top of the pan, two opposite side walls of the pan having their upper edges rolled about the wire to form a bead, the upper edges of the remaining two side walls of the pan having projecting tabs which are foldable about the wire and which are capable of being tucked beneath beads formed along corresponding edges of a supporting frame to secure the pan to the frame with portions of the tabs then projecting freely and being capable of pulled free of the frame beads to release the pan from the frame.

* * * * *